US008801849B2

(12) United States Patent
Martin et al.

(10) Patent No.: US 8,801,849 B2
(45) Date of Patent: Aug. 12, 2014

(54) POLYPHOSPHORIC ACID COMPOSITIONS HAVING A REDUCED VISCOSITY

(75) Inventors: Jean-Valery Martin, Princeton, NJ (US); Robert Finn, Westfield, NJ (US)

(73) Assignee: Innophos, Inc., Cranbury, NJ (US)

( * ) Notice: Subject to any disclaimer, the term of this patent is extended or adjusted under 35 U.S.C. 154(b) by 328 days.

(21) Appl. No.: 13/151,038

(22) Filed: Jun. 1, 2011

(65) Prior Publication Data

US 2012/0006227 A1 Jan. 12, 2012

Related U.S. Application Data

(60) Provisional application No. 61/396,670, filed on Jun. 1, 2010.

(51) Int. Cl.
*C08L 95/00* (2006.01)
*C01B 25/18* (2006.01)

(52) U.S. Cl.
USPC .................... 106/284.1; 106/287.29; 423/317

(58) Field of Classification Search
USPC ........................... 106/284.1, 287.29; 423/317
See application file for complete search history.

(56) References Cited

U.S. PATENT DOCUMENTS

| | | | | |
|---|---|---|---|---|
| 2,541,027 | A * | 2/1951 | Bradley | 148/250 |
| 3,751,278 | A * | 8/1973 | Alexander | 106/284.1 |
| 4,397,970 | A * | 8/1983 | Campbell et al. | 523/402 |
| 5,880,185 | A * | 3/1999 | Planche et al. | 524/68 |
| 6,261,356 | B1 * | 7/2001 | Isobe et al. | 106/284.1 |
| 6,808,558 | B2 * | 10/2004 | Dupuis et al. | 106/284.1 |
| 7,094,283 | B2 * | 8/2006 | Dupuis et al. | 106/281.1 |
| 2005/0284333 | A1 * | 12/2005 | Falkiewicz | 106/284.1 |
| 2008/0119591 | A1 * | 5/2008 | Falkiewicz et al. | 106/284.1 |
| 2009/0068348 | A1 * | 3/2009 | Reinke et al. | 106/284.1 |
| 2009/0249978 | A1 * | 10/2009 | Martin et al. | 106/284.1 |
| 2011/0015313 | A1 * | 1/2011 | Martin | 106/284.1 |
| 2011/0160355 | A1 * | 6/2011 | Martin | 524/68 |

OTHER PUBLICATIONS

International Search Report, Sep. 12, 2011.

* cited by examiner

*Primary Examiner* — Helene Klemanski
(74) *Attorney, Agent, or Firm* — Joanne P. Will

(57) ABSTRACT

Polyphosphoric acid compositions having a reduced viscosity compared to neat polyphosphoric acid. The viscosity of the polyphosphoric acid is reduced by combining the polyphosphoric acid with an additive that reduces the viscosity of the polyphosphoric acid composition. In one embodiment, additives that can cause solvation and/or partial neutralization of the polyphosphoric acid without the addition of water may be used. The reduced viscosity polyphosphoric acid may be used, for example, as an additive in asphalts used in road pavements.

12 Claims, 4 Drawing Sheets

Rotational viscosity of Tributylphosphate to PPA 115%wt versus temperature

Viscosity 20000.00
18000.00
16000.00
14000.00
12000.00
10000.00
8000.00
6000.00
4000.00
2000.00
0.00

30 40 50 60 70 80 90 100

Neat
TBP

Figure 1 - Rotational viscosity of Tributylphosphate to PPA 115%wt versus temperature
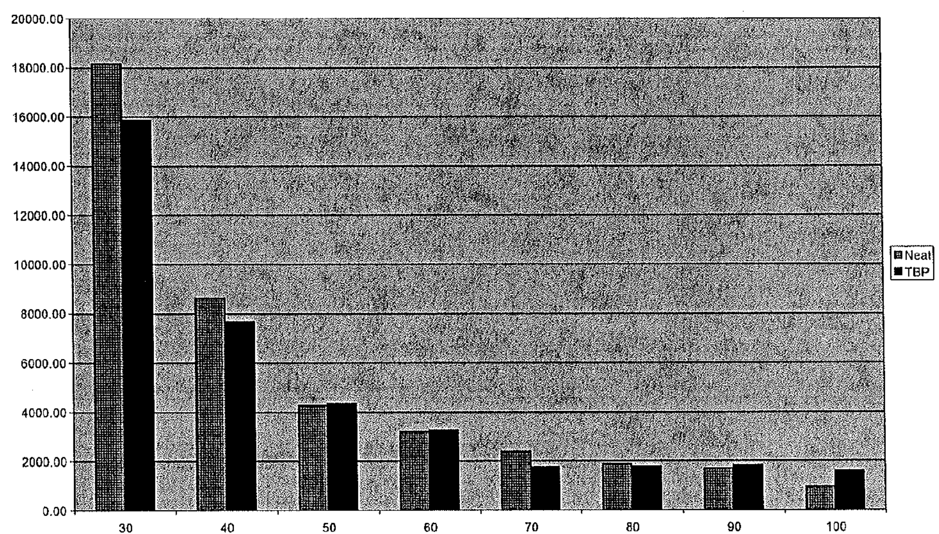

Figure 2 - Rotational viscosity of tall oil polyamine (Evotherm) to PPA 115%wt versus temperature
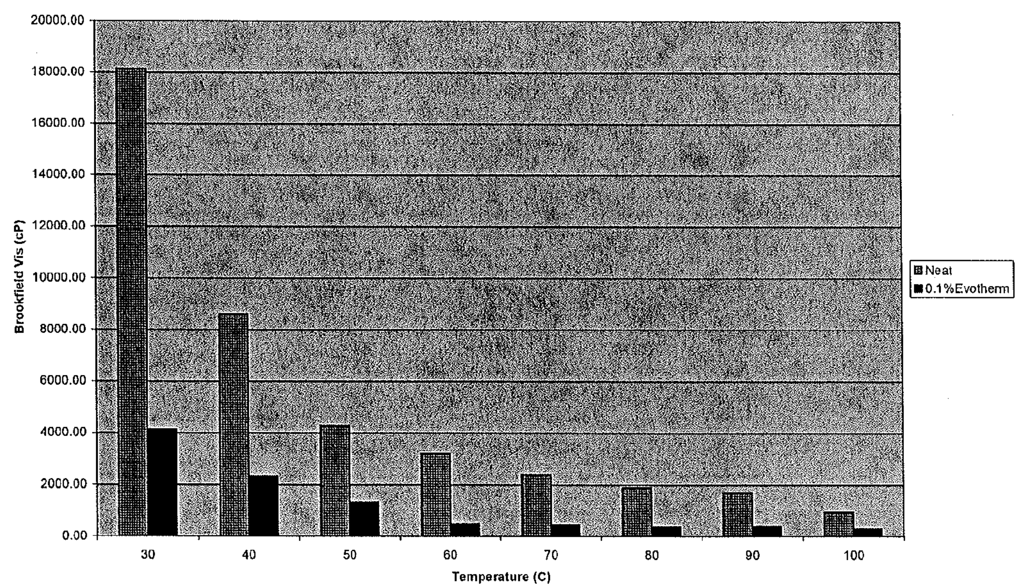

Figure 3 - Viscosity Overlay, PPA 105 & with TBP,DBBP @ 25-100°C
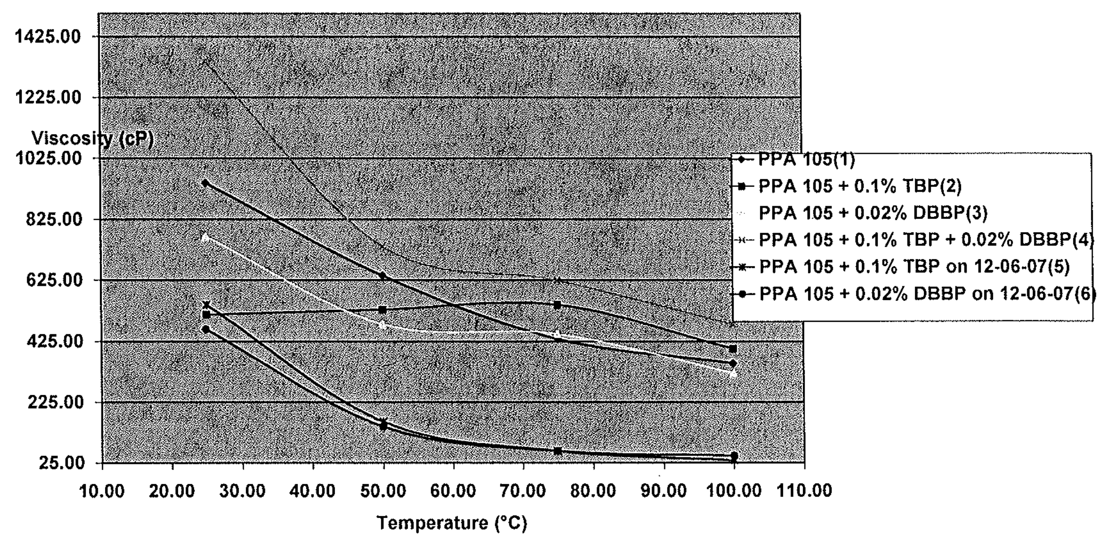

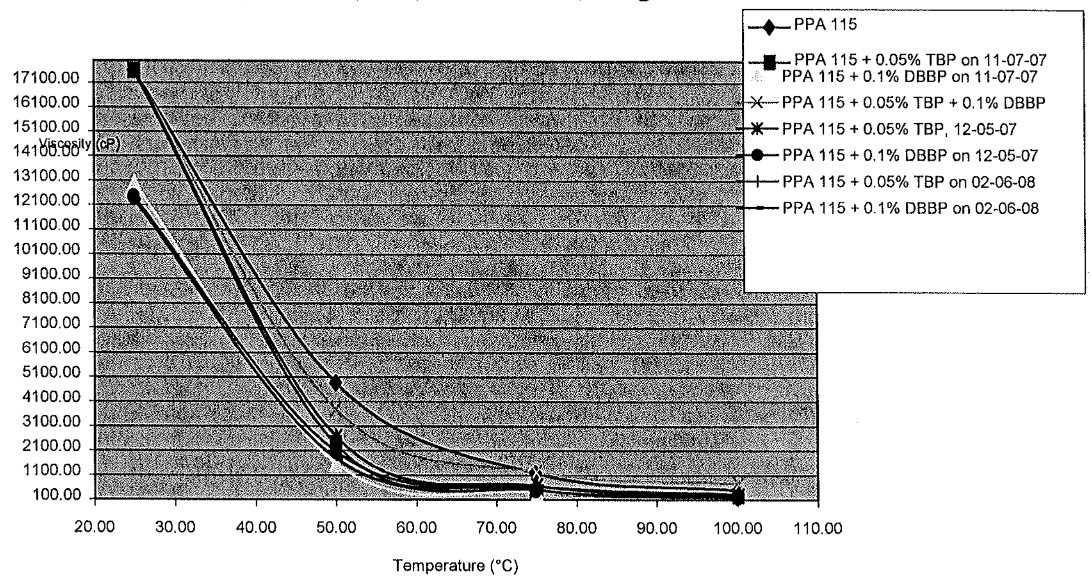
Figure 4 - Viscosity Overlay, PPA 115 & with TBP, DBBP @ 25-100°C
PPA 115
PPA 115 + 0.05% TBP on 11-07-07
PPA 115 + 0.1% DBBP on 11-07-07
PPA 115 + 0.05% TBP + 0.1% DBBP
PPA 115 + 0.05% TBP, 12-05-07
PPA 115 + 0.1% DBBP on 12-05-07
PPA 115 + 0.05% TBP on 02-06-08
PPA 115 + 0.1% DBBP on 02-06-08
Viscosity (cP)
17100.00
16100.00
15100.00
14100.00
13100.00
12100.00
11100.00
10100.00
9100.00
8100.00
7100.00
6100.00
5100.00
4100.00
3100.00
2100.00
1100.00
100.00
20.00
30.00
40.00
50.00
60.00
70.00
80.00
90.00
100.00
110.00
Temperature (°C)

POLYPHOSPHORIC ACID COMPOSITIONS HAVING A REDUCED VISCOSITY

PRIOR APPLICATIONS

This application claims the benefit of U.S. Provisional Application No. 61/396,670 filed on Jun. 1, 2010, the entire contents of which are hereby incorporated by reference.

BACKGROUND

Polyphosphoric acid (PPA) is typically made by the polymerization of phosphoric acid via a thermocondensation process. The resulting PPA product has a concentration that can be as high as 118% wt expressed as $H_3PO_4$ content. PPA is composed of polymers having different chain lengths, and the composition of PPA varies with its concentration. PPA is used in a multitude of applications where mildly strong acidity and dehydration properties are needed. However, one of the drawbacks of PPA is that, as its concentration increases, its viscosity also increases.

As a result of the increased viscosity of PPA, in order to easily use PPA for many processes, PPA must be heated to a sufficient temperature to reduce its viscosity to a level that it can be more easily handled and used, for example by pumping. In some processes, however, increased PPA temperature might not be desirable. In addition, PPA is sometimes stored in plastic containers that are not able to withstand the required higher temperature to allow the PPA to be pumped.

Accordingly, it would be desirable to have a PPA composition that provides the desired PPA concentration while having a viscosity that allows easy handling at lower temperatures than required by current PPA products.

SUMMARY OF THE INVENTION

The present invention is generally directed to polyphosphoric acid compositions having a reduced viscosity compared to neat polyphosphoric acid. The viscosity of the polyphosphoric acid is reduced by combining the polyphosphoric acid with an additive that reduces the viscosity of the polyphosphoric acid composition. In one embodiment, additives that can cause solvation and/or partial neutralization of the PPA without the addition of water may be used. Among the advantages of the polyphosphoric acid compositions is that the polyphosphoric acid can be used with little or no heating to reduce the viscosity of the polyphosphoric acid.

BRIEF DESCRIPTION OF THE DRAWINGS

FIG. 1 shows a comparison of the rotational viscosity of neat PPA (115% wt) with a composition combining PPA (115% wt) with 0.1% by weight tributylphosphate at temperatures from 30° C. to 100° C.

FIG. 2 shows a comparison of the rotational viscosity of neat PPA (115% wt) with a composition combining PPA (115% wt) with 0.1% by weight of a tall oil polyamine (Evotherm) at temperatures from 30° C. to 100° C.

FIG. 3 shows the change in viscosity with temperature for various mixtures of PPA (105% wt) with tributylphosphate and dibutyl butyl phosphonate. Two of the six tests used an "aged" PPA while the remaining four tests used recently produced PPA.

FIG. 4 shows the change in viscosity with temperature for various mixtures of PPA (115% wt) with tributylphosphate and dibutyl butyl phosphonate.

DETAILED DESCRIPTION OF PREFERRED EMBODIMENTS

Polyphosphoric acid (PPA) is a concentrated grade of phosphoric acid ($H_3PO_4$) above 95%. At these high concentrations, the $PO_4$ unites are polymerized. PPA can have a concentration that can be as high as 118% wt expressed as $H_3PO_4$ content. As the concentration and degree of polymerization of PPA increases, the viscosity also increases. As a result, PPA in its neat form can be difficult to handle at ambient temperatures. In order to use PPA in some applications, it may be necessary to pump PPA from a storage container into a mixing vessel. Due to the high viscosity of the PPA, it is often necessary to heat the PPA for pumping. This is expensive and may be difficult, particularly when the PPA is provided in a plastic storage container.

The increase in the viscosity of the PPA as its concentration is caused by the interaction of the PPA polymers and residual monomer at a molecular level. The inventor has discovered that by reducing those interactions without modifying the acidity of the PPA, it is possible to reduce the viscosity of PPA at low temperatures by 80% or more depending upon the additive used. Any additive that can cause solvation and/or partial neutralization of the PPA without the addition of water may be used. These types of additives can prevent the hydrogen to hydrogen interaction that may cause increased viscosity of PPA.

The PPA used in the compositions may have a concentration between 95% to 118% wt expressed as expressed as $H_3PO_4$ content. The PPA may be produced by any available method, and may have the purity required for a typical application. In one embodiment, the PPA is used as an additive to improve the properties of asphalt used in road paving applications.

The additive used to reduce the viscosity of the PPA is present in a concentration sufficient to reduce the viscosity of the PPA to the desired value. Examples of additives that may be used to reduce the viscosity of PPA include polyamines, amines, amidazoline, amidoamine, diester phosphate, triester phosphate, phosphonate, phosphinate, thiodiester phosphate, thiotriester phosphate, phosphonate, phosphinate, organic solvents or combinations thereof. In addition, surfactants used in asphalt emulsions, such as Evotherm™, Cecabase, may be used to produce the reduced viscosity PPA. In one embodiment, the additive is present in concentrations between 0.01% by weight to 10% by weight. In other embodiments, the additive is present in concentrations between 0.02% by weight to 5% by weight. The additive may be added to achieve a concentration of 0.1% by weight in the PPA.

The reduced viscosity PPA of the present invention may be used for any purpose for which neat PPA may be used. In one embodiment, the reduced viscosity PPA is added to asphalt to produce an improved asphalt for road pavements. The reduced viscosity PPA is added to neat asphalt in the amounts typically used as an additive in asphalt pavements, and the amount is determined based on the properties desired in the final asphalt product. In one embodiment, reduced viscosity PPA is added to achieve a concentration of PPA of between 0.05% and 5% by weight PPA. In another embodiment of the invention, reduced viscosity PPA is added to the asphalt to achieve a concentration of about 1% PPA in the asphalt.

The following examples of embodiments of the invention demonstrate that the types of additives described above can reduce the viscosity of PPA at temperatures as low as 30° C. to levels where the PPA can be easily handled and pumped without heating. These examples are not intended to limit the full scope of the invention in any way.

Example 1

In this example, tributylphosphate (TBP) was added to PPA having a concentration of 115% wt expressed as $H_3PO_4$ content to achieve a concentration of 0.1% by weight TBP. The viscosity of neat PPA (i.e. PPA 115% wt.) was measured at temperatures ranging from 30° C. to 100° C. and compared to the viscosity of the TBP/PPA mixture. The results are shown in FIG. 1.

As can be seen in FIG. 1, the addition of TBP slightly reduced the viscosity of the PPA at low temperatures, and had less effect on the viscosity at higher temperatures.

Example 2

In this example, Evotherm™ J1, a tall oil polyamine, was added to PPA having a concentration of 115% wt expressed as $H_3PO_4$ content to achieve a concentration of 0.1% by weight Evotherm in the PPA. The viscosity of neat PPA (i.e. PPA 115% wt.) was measured at temperatures ranging from 30° C. to 100° C. and compared to the viscosity of the 0.1% Evotherm/PPA mixture. The results are shown in the chart in FIG. 2.

As can be seen in FIG. 2, the viscosity of the Evotherm/PPA mixtures is greatly reduced at all temperatures as compared to neat PPA.

Example 3

In this example, TBP and/or DBBP (dibutyl butyl phosphonate) was added to PPA having a concentration of 105% wt expressed as $H_3PO_4$ content. The viscosity of neat PPA (i.e. PPA 105% wt.) was measured at temperatures ranging from 30° C. to 100° C. and compared to the viscosity of various mixtures of the PPA with TBP, DBBP or combinations of TBP and DBBP. Two of the tests used "aged" PPA, i.e. PPA that had been produced in December 2007, while the remaining tests used PPA that had been more recently produced. The results are shown in the chart in FIG. 3.

This data illustrates that the effect of TBP on the viscosity of PPA depends on both the temperature and the age of the PPA. As shown in FIG. 3, the effect of the addition of TBP and DBBP was greater in tests using the "aged" PPA.

Example 4

In this example, TBP and/or DBBP was added to PPA having a concentration of 115% wt expressed as $H_3PO_4$ content. The viscosity of neat PPA (i.e. PPA 115% wt.) was measured at temperatures ranging from 30° C. to 100° C. and compared to the viscosity of various mixtures of the PPA with TBP, DBBP or combinations of TBP and DBBP. The results are shown in the chart in FIG. 4.

As shown in FIG. 4, at low temperatures (for example below 70° C.), the addition of TBP and/or DBBP reduces the viscosity of the 115% PPA significantly below the viscosity of neat 115% PPA.

Example 5

Tests were performed to assess whether the lower viscosity PPA produced by the addition of the additives discussed above affects the properties of PPA in a particular application. PPA is typically used to increase the softening point of neat asphalt. A first composition was made composed of neat asphalt combined with standard 115% PPA to produce a composition having 1% by weight PPA. A second composition was made composed of neat asphalt combined with a reduced viscosity PPA produced by the addition of 0.1% Evotherm J1. The softening point of the asphalt compositions is summarized in Table 1 below.

TABLE 1

| | Softening Point (° C.) | | |
|---|---|---|---|
| Description | 1st Reading | 2nd Reading | Average |
| Neat Asphalt + 1% PPA | 54.5 | 54.4 | 54.45 |
| Neat Asphalt + 1% PPA w/ 0.1% Evotherm J1 | 54.2 | 54.3 | 54.25 |

As can be seen in the results in Table 1, the asphalt produced with an embodiment of the low viscosity PPA of the present invention has approximately the same softening point as that of standard PPA. This demonstrates that the low viscosity PPA is satisfactory for this application.

Example 6

In this example, 2-ethyl hexyl phosphoric acid was added to PPA having a concentration of 115% wt expressed as $H_3PO_4$ content. The viscosity of neat PPA (i.e. PPA 115% wt.) was measured at 70° C. and compared to the viscosity of mixtures of PPA with various concentrations of ethyl hexyl phosphoric acid. Four different lots of PPA were used for the testing. The results are shown in Table 2 below.

TABLE 2

| % wt ethyl hexyl phosphoric acid | PPA 115% lot 1 (viscosity cP) | PPA 115% lot 2 (viscosity cP) | PPA 115% lot 3 (viscosity cP) | PPA 115% lot 4 (viscosity cP) |
|---|---|---|---|---|
| 0.0 | 2187 | 2517 | 2464 | 2389 |
| 0.05 | 1547 | | | |
| 0.1 | 1589 | 2315 | 1182 | 1547 |
| 0.2 | 1451 | | | |
| 0.3 | 992 | | | |

As can be seen from the results in Table 2, all of the compositions containing ethyl hexyl phosphate have a reduced viscosity compared to neat PPA. The viscosity is further reduced as the concentration of ethyl hexyl phosphate is increased.

While preferred embodiments have been shown and described, various modifications may be made to the processes described above without departing from the spirit and scope of the invention as described in the appended claims. Accordingly, it is to be understood that the present invention has been described herein by way of example and not by limitation.

We claim:

1. A reduced viscosity polyphosphoric acid composition comprising polyphosphoric acid having an acid concentration of between 95% and 118% wt expressed as $H_3PO_4$ content and from about 0.01% by weight to about 10% by weight of an additive that reduces the viscosity of the polyphosphoric acid wherein the additive is selected from the group consisting of polyamines, amines, amidazoline, amidoamine, diester phosphate, triester phosphate, phosphonates, phosphinates, thiodiester phosphate, thiotriester phosphate, 2-ethyl hexyl phosphoric acid, tributylphosphate, dibutyl butyl phosphonate and combinations thereof.

2. An asphalt composition comprising (a) asphalt and (b) polyphosphoric acid having an acid concentration of between 95% and 118% wt expressed as $H_3PO4$ content and from about 0.01% by weight to about 10% by weight of an additive that reduces the viscosity of the polyphosphoric acid wherein the additive is selected from the group consisting of polyamines, amines, amidazoline, amidoamine, diester phosphate, triester phosphate, phosphonates, phosphinates, thiodiester phosphate, thiotriester phosphate, 2-ethyl hexyl phosphoric acid, tributylphosphate, dibutyl butyl phosphonate and combinations thereof.

3. A reduced viscosity polyphosphoric acid composition comprising polyphosphoric acid having an acid concentration of between 95% and 118% wt expressed as $H_3PO4$ content and from 0.01% by weight to 10% by weight of an additive that reduces the viscosity of the polyphosphoric acid, wherein, said additive is selected from the group consisting of tributylphosphate, dibutyl butyl phosphonate and combinations thereof.

4. A reduced viscosity polyphosphoric acid composition comprising polyphosphoric acid having an acid concentration of between 95% and 118% wt expressed as $H_3PO4$ content and from 0.02% by weight to 0.2% by weight of an additive that reduces the viscosity of the polyphosphoric acid, wherein said additive is selected from the group consisting of tributylphosphate, dibutyl butyl phosphonate and combinations thereof.

5. A reduced viscosity polyphosphoric acid composition comprising polyphosphoric acid having an acid concentration of between 95% and 118% wt expressed as $H_3PO4$ content and from 0.02% by weight to 0.2% by weight of an additive that reduces the viscosity of the polyphosphoric acid, wherein said additive is a tall oil polyamine.

6. A reduced viscosity polyphosphoric acid composition comprising polyphosphoric acid having an acid concentration of between 95% and 118% wt expressed as $H_3PO4$ content and from 0.02% by weight to 0.5% by weight of an additive that reduces the viscosity of the polyphosphoric acid, wherein said additive is 2-ethyl hexyl phosphoric acid.

7. An asphalt composition comprising (a) asphalt and (b) polyphosphoric acid having an acid concentration of between 95% and 118% wt expressed as $H_3PO4$ content and from about 0.01% by weight to about 10% by weight of an additive that reduces the viscosity of the polyphosphoric acid, wherein the additive is selected from the group consisting of tributylphosphate, dibutyl butyl phosphonate and combinations thereof.

8. An asphalt composition comprising (a) asphalt and (b) polyphosphoric acid having an acid concentration of between 95% and 118% wt expressed as $H_3PO4$ content and from 0.02% by weight to 0.2% by weight of an additive that reduces the viscosity of the polyphosphoric acid, wherein the additive is selected from the group consisting of tributylphosphate, dibutyl butyl phosphonate and combinations thereof.

9. An asphalt composition comprising (a) asphalt and (b) polyphosphoric acid having an acid concentration of between 95% and 118% wt expressed as $H_3PO4$ content and from 0.01% by weight to 10% by weight of an additive that reduces the viscosity of the polyphosphoric acid, wherein the additive is a tall oil polyamine.

10. An asphalt composition comprising (a) asphalt and (b) polyphosphoric acid having an acid concentration of between 95% and 118% wt expressed as $H_3PO4$ content and from 0.02% by weight to 0.2% by weight of an additive that reduces the viscosity of the polyphosphoric acid, wherein the additive is a tall oil polyamine.

11. An asphalt composition comprising (a) asphalt and (b) polyphosphoric acid having an acid concentration of between 95% and 118% wt expressed as $H_3PO4$ content and from about 0.01% by weight to about 10% by weight of an additive that reduces the viscosity of the polyphosphoric acid, wherein the additive is 2-ethyl hexyl phosphoric acid.

12. An asphalt composition comprising (a) asphalt and (b) polyphosphoric acid having an acid concentration of between 95% and 118% wt expressed as $H_3PO4$ content and from 0.02% by weight to 0.5% by weight of an additive that reduces the viscosity of the polyphosphoric acid, wherein the additive is 2-ethyl hexyl phosphoric acid.

* * * * *